United States Patent
Nath et al.

(10) Patent No.: US 8,463,925 B1
(45) Date of Patent: Jun. 11, 2013

(54) TABLE DRIVEN EVENT PROCESSING OF MULTIPLE STATEFUL PROTOCOLS IN A HIGH PERFORMANCE NETWORK STACK FRAMEWORK

(75) Inventors: Anuj Nath, Stoneham, MA (US); Tibor F. Ivanyi, Pelham, NH (US); David Hsing-Wang Wong, Billerica, MA (US)

(73) Assignee: Empirix Inc., Billerica, MA (US)

( * ) Notice: Subject to any disclaimer, the term of this patent is extended or adjusted under 35 U.S.C. 154(b) by 1281 days.

(21) Appl. No.: 12/247,682

(22) Filed: Oct. 8, 2008

Related U.S. Application Data

(60) Provisional application No. 60/978,207, filed on Oct. 8, 2007.

(51) Int. Cl.
G06F 15/16 (2006.01)
(52) U.S. Cl.
USPC .......................................... 709/230; 709/238
(58) Field of Classification Search
USPC ................. 709/230, 231, 232, 238, 239, 240, 709/249, 251
See application file for complete search history.

(56) References Cited

U.S. PATENT DOCUMENTS

| | | | | |
|---|---|---|---|---|
| 5,668,978 A | * | 9/1997 | Yasutake et al. | 703/26 |
| 5,931,914 A | * | 8/1999 | Chiu | 709/230 |
| 6,145,009 A | * | 11/2000 | Miyazawa et al. | 709/236 |
| 2003/0177252 A1 | * | 9/2003 | Krichevski et al. | 709/230 |
| 2006/0087977 A1 | * | 4/2006 | Tatman | 370/242 |
| 2007/0067481 A1 | * | 3/2007 | Sharma et al. | 709/231 |
| 2007/0266394 A1 | * | 11/2007 | Odent et al. | 719/316 |
| 2008/0175242 A1 | * | 7/2008 | Klish | 370/392 |
| 2009/0006067 A1 | * | 1/2009 | Raghavan et al. | 703/16 |

* cited by examiner

Primary Examiner — Dhairya A Patel
(74) Attorney, Agent, or Firm — Woodcock Washburn LLP

(57) ABSTRACT

Methods and apparatus provide for a finite state machine environment to receive at least one event. The finite state machine environment converts the event to a finite state machine event. The finite state machine environment selects a first event processing table from a plurality of interoperable event processing tables. The finite state machine environment processes the finite state machine event in the first event processing table to determine an action to perform based on a state of the finite state machine embodied by the first event processing table and a type of the event.

15 Claims, 11 Drawing Sheets

| State 161 | Event 162 | New state 163 | Application Event 164 | Timer action 165 | TCP flags for packet 166 |
|---|---|---|---|---|---|
| DATAStart | | | | | |
| TCP_STATE_CLOSED | TCP_EVENT_OPEN | TCP_STATE_SYN_SENT | 0 | TCP_TIMER_SCHEDULE_RETX | TCP_FLAG_SYN |
| TCP_STATE_CLOSED | TCP_EVENT_OPEN_PASSIVE | TCP_STATE_LISTEN | 0 | 0 | 0 |
| TCP_STATE_CLOSED | TCP_EVENT_CLOSE | TCP_STATE_CLOSED | TCP_APP_EVENT_CONNECTION_CLOSED | 0 | 0 |
| TCP_STATE_CLOSED | TCP_EVENT_SDAT | TCP_STATE_CLOSED | 0 | 0 | 0 |
| TCP_STATE_CLOSED | TCP_EVENT_RESET | TCP_STATE_CLOSED | 0 | 0 | 0 |
| TCP_STATE_CLOSED | TCP_EVENT_SYN | TCP_STATE_CLOSED | 0 | 0 | TCP_FLAG_RST |
| TCP_STATE_CLOSED | TCP_EVENT_SYN_ACK | TCP_STATE_CLOSED | 0 | 0 | TCP_FLAG_RST |
| TCP_STATE_CLOSED | TCP_EVENT_ACK | TCP_STATE_CLOSED | 0 | 0 | TCP_FLAG_RST |
| TCP_STATE_CLOSED | TCP_EVENT_FIN | TCP_STATE_CLOSED | 0 | 0 | TCP_FLAG_RST |
| TCP_STATE_CLOSED | TCP_EVENT_FIN_ACK | TCP_STATE_CLOSED | 0 | 0 | TCP_FLAG_RST |
| TCP_STATE_CLOSED | TCP_EVENT_DATA | TCP_STATE_CLOSED | 0 | 0 | TCP_FLAG_RST |
| TCP_STATE_CLOSED | TCP_EVENT_TIME_M | TCP_STATE_CLOSED | 0 | 0 | 0 |
| TCP_STATE_CLOSED | TCP_EVENT_TIME_P | TCP_STATE_CLOSED | 0 | 0 | 0 |
| TCP_STATE_LISTEN | TCP_EVENT_OPEN | TCP_STATE_LISTEN | 0 | 0 | 0 |
| TCP_STATE_LISTEN | TCP_EVENT_OPEN_PASSIVE | TCP_STATE_LISTEN | 0 | 0 | 0 |
| TCP_STATE_LISTEN | TCP_EVENT_CLOSE | TCP_STATE_CLOSED | TCP_APP_EVENT_CONNECTION_CLOSED | 0 | 0 |
| TCP_STATE_LISTEN | TCP_EVENT_SDAT | TCP_STATE_LISTEN | 0 | 0 | 0 |
| TCP_STATE_LISTEN | TCP_EVENT_RESET | TCP_STATE_LISTEN | 0 | 0 | 0 |
| TCP_STATE_LISTEN | TCP_EVENT_SYN | TCP_STATE_SYN_RCVD | 0 | TCP_TIMER_SCHEDULE_RETX | TCP_FLAG_SACK |
| TCP_STATE_LISTEN | TCP_EVENT_SYN_ACK | TCP_STATE_LISTEN | 0 | 0 | TCP_FLAG_RST |
| TCP_STATE_LISTEN | TCP_EVENT_ACK | TCP_STATE_LISTEN | 0 | 0 | TCP_FLAG_RST |
| TCP_STATE_LISTEN | TCP_EVENT_FIN | TCP_STATE_LISTEN | 0 | 0 | 0 |
| TCP_STATE_LISTEN | TCP_EVENT_FIN_ACK | TCP_STATE_LISTEN | 0 | 0 | 0 |
| TCP_STATE_LISTEN | TCP_EVENT_DATA | TCP_STATE_LISTEN | 0 | 0 | 0 |
| TCP_STATE_LISTEN | TCP_EVENT_TIME_M | TCP_STATE_LISTEN | 0 | 0 | 0 |
| TCP_STATE_LISTEN | TCP_EVENT_TIME_P | TCP_STATE_LISTEN | 0 | 0 | 0 |
| TCP_STATE_SYN_RCVD | TCP_EVENT_OPEN | TCP_STATE_SYN_RCVD | 0 | 0 | 0 |
| TCP_STATE_SYN_RCVD | TCP_EVENT_OPEN_PASSIVE | TCP_STATE_SYN_RCVD | 0 | 0 | 0 |
| TCP_STATE_SYN_RCVD | TCP_EVENT_CLOSE | TCP_STATE_FIN_WAIT_1 | 0 | 0 | TCP_FLAG_FACK |
| TCP_STATE_SYN_RCVD | TCP_EVENT_SDAT | TCP_STATE_SYN_RCVD | 0 | 0 | 0 |
| TCP_STATE_SYN_RCVD | TCP_EVENT_RESET | TCP_STATE_LISTEN | 0 | TCP_TIMER_CANCEL | 0 |
| TCP_STATE_SYN_RCVD | TCP_EVENT_SYN | TCP_STATE_SYN_RCVD | 0 | TCP_TIMER_CAN_SCH_RETX | TCP_FLAG_SACK |
| TCP_STATE_SYN_RCVD | TCP_EVENT_SYN_ACK | TCP_STATE_ESTABLISHED | TCP_APP_EVENT_CONNECTION_OPENED | TCP_TIMER_CANCEL | TCP_FLAG_ACK |
| TCP_STATE_SYN_RCVD | TCP_EVENT_ACK | TCP_STATE_ESTABLISHED | TCP_APP_EVENT_CONNECTION_OPENED | TCP_TIMER_CANCEL | 0 |
| TCP_STATE_SYN_RCVD | TCP_EVENT_FIN | TCP_STATE_CLOSE_WAIT | TCP_APP_EVENT_CONNECTION_FAILED | TCP_TIMER_CANCEL | TCP_FLAG_ACK |
| TCP_STATE_SYN_RCVD | TCP_EVENT_FIN_ACK | TCP_STATE_CLOSE_WAIT | TCP_APP_EVENT_CONNECTION_FAILED | TCP_TIMER_CANCEL | TCP_FLAG_ACK |
| TCP_STATE_SYN_RCVD | TCP_EVENT_DATA | TCP_STATE_SYN_RCVD | 0 | 0 | 0 |
| TCP_STATE_SYN_RCVD | TCP_EVENT_TIME_M | TCP_STATE_SYN_RCVD | TCP_APP_EVENT_CONNECTION_FAILED | TCP_TIMER_SCHEDULE_RETX | TCP_FLAG_SACK |
| TCP_STATE_SYN_RCVD | TCP_EVENT_TIME_P | TCP_STATE_CLOSED | 0 | 0 | 0 |
| TCP_STATE_SYN_SENT | TCP_EVENT_OPEN | TCP_STATE_SYN_SENT | 0 | 0 | 0 |
| TCP_STATE_SYN_SENT | TCP_EVENT_OPEN_PASSIVE | TCP_STATE_SYN_SENT | 0 | 0 | 0 |
| TCP_STATE_SYN_SENT | TCP_EVENT_CLOSE | TCP_STATE_CLOSED | TCP_APP_EVENT_CONNECTION_CLOSED | TCP_TIMER_CANCEL | 0 |
| TCP_STATE_SYN_SENT | TCP_EVENT_SDAT | TCP_STATE_SYN_SENT | 0 | 0 | 0 |
| TCP_STATE_SYN_SENT | TCP_EVENT_RESET | TCP_STATE_CLOSED | TCP_APP_EVENT_CONNECTION_FAILED | TCP_TIMER_CANCEL | 0 |
| TCP_STATE_SYN_SENT | TCP_EVENT_SYN | TCP_STATE_SYN_RCVD | 0 | TCP_TIMER_CAN_SCH_RETX | TCP_FLAG_SACK / TCP_FLAG_ACK |
| TCP_STATE_SYN_SENT | TCP_EVENT_SYN_ACK | TCP_STATE_ESTABLISHED | TCP_APP_EVENT_CONNECTION_OPENED | TCP_TIMER_CANCEL | 0 |
| TCP_STATE_SYN_SENT | TCP_EVENT_ACK | TCP_STATE_SYN_SENT | 0 | 0 | 0 |
| TCP_STATE_SYN_SENT | TCP_EVENT_FIN | TCP_STATE_SYN_SENT | 0 | 0 | 0 |
| TCP_STATE_SYN_SENT | TCP_EVENT_FIN_ACK | TCP_STATE_SYN_SENT | 0 | 0 | 0 |

FIG. 3

| 161-1 | 162-1 | 163-1 | 164-1 | 165-1 | 166-1 |
|---|---|---|---|---|---|
| TCP_STATE_SYN_SENT | TCP_EVENT_DATA | TCP_STATE_SYN_SENT | 0 | 0 | 0 |
| TCP_STATE_SYN_SENT | TCP_EVENT_TIME_M | TCP_STATE_SYN_SENT | 0 | TCP_TIMER_SCHEDULE_RETX | TCP_FLAG_SYN |
| TCP_STATE_SYN_SENT | TCP_EVENT_TIME_P | TCP_STATE_CLOSED | TCP_APP_EVENT_CONNECTION_FAILED | 0 | 0 |
| TCP_STATE_ESTABLISHED | TCP_EVENT_OPEN | TCP_STATE_ESTABLISHED | 0 | 0 | 0 |
| TCP_STATE_ESTABLISHED | TCP_EVENT_OPEN_PASSIVE | TCP_STATE_ESTABLISHED | 0 | 0 | 0 |
| TCP_STATE_ESTABLISHED | TCP_EVENT_CLOSE | TCP_STATE_FIN_WAIT_1 | 0 | TCP_TIMER_CAN_SCH_RETX | TCP_FLAG_FACK |
| TCP_STATE_ESTABLISHED | TCP_EVENT_SDAT | TCP_STATE_ESTABLISHED | 0 | 0 | 0 |
| TCP_STATE_ESTABLISHED | TCP_EVENT_RESET | TCP_STATE_CLOSED | TCP_APP_EVENT_CONNECTION_TERMINATE | TCP_TIMER_CANCEL | 0 |
| TCP_STATE_ESTABLISHED | TCP_EVENT_SYN | TCP_STATE_ESTABLISHED | 0 | 0 | TCP_FLAG_ACK |
| TCP_STATE_ESTABLISHED | TCP_EVENT_SYN_ACK | TCP_STATE_ESTABLISHED | 0 | 0 | TCP_FLAG_ACK |
| TCP_STATE_ESTABLISHED | TCP_EVENT_ACK | TCP_STATE_ESTABLISHED | 0 | 0 | 0 |
| TCP_STATE_ESTABLISHED | TCP_EVENT_FIN | TCP_STATE_CLOSE_WAIT | TCP_APP_EVENT_CONNECTION_TERMINATE | TCP_TIMER_CANCEL | TCP_FLAG_ACK |
| TCP_STATE_ESTABLISHED | TCP_EVENT_FIN_ACK | TCP_STATE_CLOSE_WAIT | TCP_APP_EVENT_CONNECTION_TERMINATE | TCP_TIMER_CANCEL | TCP_FLAG_ACK |
| TCP_STATE_ESTABLISHED | TCP_EVENT_DATA | TCP_STATE_ESTABLISHED | 0 | TCP_TIMER_CANCEL | TCP_FLAG_ACK |
| TCP_STATE_ESTABLISHED | TCP_EVENT_TIME_M | TCP_STATE_ESTABLISHED | 0 | TCP_TIMER_SCHEDULE_RETX | 0 |
| TCP_STATE_ESTABLISHED | TCP_EVENT_TIME_P | TCP_STATE_ESTABLISHED | TCP_APP_EVENT_SEND_FAILED | 0 | 0 |
| TCP_STATE_CLOSE_WAIT | TCP_EVENT_OPEN | TCP_STATE_CLOSE_WAIT | 0 | 0 | 0 |
| TCP_STATE_CLOSE_WAIT | TCP_EVENT_OPEN_PASSIVE | TCP_STATE_CLOSE_WAIT | 0 | 0 | 0 |
| TCP_STATE_CLOSE_WAIT | TCP_EVENT_CLOSE | TCP_STATE_LAST_ACK | 0 | TCP_TIMER_SCHEDULE_RETX | 0 |
| TCP_STATE_CLOSE_WAIT | TCP_EVENT_SDAT | TCP_STATE_CLOSE_WAIT | 0 | 0 | 0 |
| TCP_STATE_CLOSE_WAIT | TCP_EVENT_RESET | TCP_STATE_CLOSE_WAIT | TCP_APP_EVENT_CONNECTION_TERMINATE | 0 | 0 |
| TCP_STATE_CLOSE_WAIT | TCP_EVENT_SYN | TCP_STATE_CLOSE_WAIT | 0 | 0 | 0 |
| TCP_STATE_CLOSE_WAIT | TCP_EVENT_SYN_ACK | TCP_STATE_CLOSE_WAIT | 0 | 0 | 0 |
| TCP_STATE_CLOSE_WAIT | TCP_EVENT_ACK | TCP_STATE_CLOSE_WAIT | 0 | 0 | 0 |
| TCP_STATE_CLOSE_WAIT | TCP_EVENT_FIN | TCP_STATE_CLOSE_WAIT | 0 | 0 | 0 |
| TCP_STATE_CLOSE_WAIT | TCP_EVENT_FIN_ACK | TCP_STATE_CLOSE_WAIT | 0 | 0 | 0 |
| TCP_STATE_CLOSE_WAIT | TCP_EVENT_DATA | TCP_STATE_CLOSE_WAIT | 0 | 0 | 0 |
| TCP_STATE_CLOSE_WAIT | TCP_EVENT_TIME_M | TCP_STATE_CLOSE_WAIT | 0 | 0 | 0 |
| TCP_STATE_CLOSE_WAIT | TCP_EVENT_TIME_P | TCP_STATE_CLOSE_WAIT | 0 | 0 | 0 |
| TCP_STATE_LAST_ACK | TCP_EVENT_OPEN | TCP_STATE_LAST_ACK | 0 | 0 | 0 |
| TCP_STATE_LAST_ACK | TCP_EVENT_OPEN_PASSIVE | TCP_STATE_LAST_ACK | 0 | 0 | 0 |
| TCP_STATE_LAST_ACK | TCP_EVENT_CLOSE | TCP_STATE_LAST_ACK | 0 | 0 | 0 |
| TCP_STATE_LAST_ACK | TCP_EVENT_SDAT | TCP_STATE_LAST_ACK | 0 | 0 | 0 |
| TCP_STATE_LAST_ACK | TCP_EVENT_RESET | TCP_STATE_CLOSED | TCP_APP_EVENT_CONNECTION_CLOSED | TCP_TIMER_CANCEL | 0 |
| TCP_STATE_LAST_ACK | TCP_EVENT_SYN | TCP_STATE_LAST_ACK | 0 | 0 | 0 |
| TCP_STATE_LAST_ACK | TCP_EVENT_SYN_ACK | TCP_STATE_LAST_ACK | 0 | 0 | 0 |
| TCP_STATE_LAST_ACK | TCP_EVENT_ACK | TCP_STATE_CLOSED | TCP_APP_EVENT_CONNECTION_CLOSED | TCP_TIMER_CANCEL | 0 |
| TCP_STATE_LAST_ACK | TCP_EVENT_FIN | TCP_STATE_LAST_ACK | 0 | 0 | 0 |
| TCP_STATE_LAST_ACK | TCP_EVENT_FIN_ACK | TCP_STATE_CLOSED | TCP_APP_EVENT_CONNECTION_CLOSED | TCP_TIMER_CANCEL | 0 |
| TCP_STATE_LAST_ACK | TCP_EVENT_DATA | TCP_STATE_LAST_ACK | 0 | 0 | 0 |
| TCP_STATE_LAST_ACK | TCP_EVENT_TIME_M | TCP_STATE_LAST_ACK | 0 | TCP_TIMER_SCHEDULE_RETX | 0 |
| TCP_STATE_LAST_ACK | TCP_EVENT_TIME_P | TCP_STATE_LAST_ACK | TCP_APP_EVENT_CONNECTION_CLOSED | 0 | 0 |
| TCP_STATE_FIN_WAIT_1 | TCP_EVENT_OPEN | TCP_STATE_FIN_WAIT_1 | 0 | 0 | 0 |
| TCP_STATE_FIN_WAIT_1 | TCP_EVENT_OPEN_PASSIVE | TCP_STATE_FIN_WAIT_1 | 0 | 0 | 0 |
| TCP_STATE_FIN_WAIT_1 | TCP_EVENT_CLOSE | TCP_STATE_FIN_WAIT_1 | 0 | 0 | 0 |
| TCP_STATE_FIN_WAIT_1 | TCP_EVENT_SDAT | TCP_STATE_FIN_WAIT_1 | 0 | 0 | 0 |
| TCP_STATE_FIN_WAIT_1 | TCP_EVENT_RESET | TCP_STATE_CLOSED | TCP_APP_EVENT_CONNECTION_CLOSED | TCP_TIMER_CANCEL | 0 |
| TCP_STATE_FIN_WAIT_1 | TCP_EVENT_SYN | TCP_STATE_FIN_WAIT_1 | 0 | 0 | 0 |
| TCP_STATE_FIN_WAIT_1 | TCP_EVENT_SYN_ACK | TCP_STATE_FIN_WAIT_1 | 0 | 0 | 0 |
| TCP_STATE_FIN_WAIT_1 | TCP_EVENT_ACK | TCP_STATE_FIN_WAIT_2 | 0 | TCP_TIMER_CANCEL | 0 |
| TCP_STATE_FIN_WAIT_1 | TCP_EVENT_FIN | TCP_STATE_CLOSING | 0 | TCP_TIMER_CANCEL | TCP_FLAG_ACK |

FIG. 4    160-1

| 161-2 | 162-2 | 163-2 | 164-2 | 165-2 | 166-2 |
|---|---|---|---|---|---|
| TCP_STATE_FIN_WAIT_1 | TCP_EVENT_FIN_ACK | TCP_STATE_TIME_WAIT | 0 | TCP_TIMER_CAN_SCH_MSL | TCP_FLAG_ACK |
| TCP_STATE_FIN_WAIT_1 | TCP_EVENT_DATA | TCP_STATE_FIN_WAIT_1 | 0 | 0 | TCP_FLAG_ACK |
| TCP_STATE_FIN_WAIT_1 | TCP_EVENT_TIME_M | TCP_STATE_FIN_WAIT_1 | 0 | TCP_TIMER_SCHEDULE_RETX | TCP_FLAG_FACK |
| TCP_STATE_FIN_WAIT_1 | TCP_EVENT_TIME_P | TCP_STATE_CLOSED | 0 | 0 | TCP_FLAG_RST |
| TCP_STATE_FIN_WAIT_2 | TCP_EVENT_OPEN | TCP_STATE_FIN_WAIT_2 | 0 | 0 | 0 |
| TCP_STATE_FIN_WAIT_2 | TCP_EVENT_OPEN_PASSIVE | TCP_STATE_FIN_WAIT_2 | 0 | 0 | 0 |
| TCP_STATE_FIN_WAIT_2 | TCP_EVENT_CLOSE | TCP_STATE_FIN_WAIT_2 | 0 | 0 | 0 |
| TCP_STATE_FIN_WAIT_2 | TCP_EVENT_SDAT | TCP_STATE_FIN_WAIT_2 | 0 | 0 | 0 |
| TCP_STATE_FIN_WAIT_2 | TCP_EVENT_RESET | TCP_STATE_CLOSED | TCP_APP_EVENT_CONNECTION_CLOSED | 0 | 0 |
| TCP_STATE_FIN_WAIT_2 | TCP_EVENT_SYN | TCP_STATE_FIN_WAIT_2 | 0 | 0 | 0 |
| TCP_STATE_FIN_WAIT_2 | TCP_EVENT_SYN_ACK | TCP_STATE_FIN_WAIT_2 | 0 | 0 | 0 |
| TCP_STATE_FIN_WAIT_2 | TCP_EVENT_ACK | TCP_STATE_FIN_WAIT_2 | 0 | 0 | TCP_FLAG_ACK |
| TCP_STATE_FIN_WAIT_2 | TCP_EVENT_FIN | TCP_STATE_TIME_WAIT | 0 | TCP_TIMER_SCHEDULE_MSL | TCP_FLAG_ACK |
| TCP_STATE_FIN_WAIT_2 | TCP_EVENT_FIN_ACK | TCP_STATE_TIME_WAIT | 0 | TCP_TIMER_SCHEDULE_MSL | TCP_FLAG_ACK |
| TCP_STATE_FIN_WAIT_2 | TCP_EVENT_DATA | TCP_STATE_FIN_WAIT_2 | 0 | 0 | 0 |
| TCP_STATE_FIN_WAIT_2 | TCP_EVENT_TIME_M | TCP_STATE_FIN_WAIT_2 | 0 | 0 | 0 |
| TCP_STATE_FIN_WAIT_2 | TCP_EVENT_TIME_P | TCP_STATE_FIN_WAIT_2 | 0 | 0 | 0 |
| TCP_STATE_CLOSING | TCP_EVENT_OPEN | TCP_STATE_CLOSING | 0 | 0 | 0 |
| TCP_STATE_CLOSING | TCP_EVENT_OPEN_PASSIVE | TCP_STATE_CLOSING | 0 | 0 | 0 |
| TCP_STATE_CLOSING | TCP_EVENT_CLOSE | TCP_STATE_CLOSING | 0 | 0 | 0 |
| TCP_STATE_CLOSING | TCP_EVENT_SDAT | TCP_STATE_CLOSING | 0 | 0 | 0 |
| TCP_STATE_CLOSING | TCP_EVENT_RESET | TCP_STATE_CLOSED | TCP_APP_EVENT_CONNECTION_CLOSED | 0 | 0 |
| TCP_STATE_CLOSING | TCP_EVENT_SYN | TCP_STATE_CLOSING | 0 | 0 | 0 |
| TCP_STATE_CLOSING | TCP_EVENT_SYN_ACK | TCP_STATE_CLOSING | 0 | 0 | 0 |
| TCP_STATE_CLOSING | TCP_EVENT_ACK | TCP_STATE_TIME_WAIT | 0 | TCP_TIMER_CAN_SCH_MSL | TCP_FLAG_ACK |
| TCP_STATE_CLOSING | TCP_EVENT_FIN | TCP_STATE_CLOSING | 0 | 0 | TCP_FLAG_ACK |
| TCP_STATE_CLOSING | TCP_EVENT_FIN_ACK | TCP_STATE_TIME_WAIT | 0 | TCP_TIMER_CAN_SCH_MSL | TCP_FLAG_RST |
| TCP_STATE_CLOSING | TCP_EVENT_DATA | TCP_STATE_CLOSING | 0 | 0 | 0 |
| TCP_STATE_CLOSING | TCP_EVENT_TIME_M | TCP_STATE_CLOSING | 0 | 0 | 0 |
| TCP_STATE_CLOSING | TCP_EVENT_TIME_P | TCP_STATE_CLOSED | TCP_APP_EVENT_CONNECTION_CLOSED | 0 | 0 |
| TCP_STATE_TIME_WAIT | TCP_EVENT_OPEN | TCP_STATE_TIME_WAIT | 0 | 0 | 0 |
| TCP_STATE_TIME_WAIT | TCP_EVENT_OPEN_PASSIVE | TCP_STATE_TIME_WAIT | 0 | 0 | 0 |
| TCP_STATE_TIME_WAIT | TCP_EVENT_CLOSE | TCP_STATE_TIME_WAIT | 0 | 0 | 0 |
| TCP_STATE_TIME_WAIT | TCP_EVENT_SDAT | TCP_STATE_TIME_WAIT | 0 | 0 | 0 |
| TCP_STATE_TIME_WAIT | TCP_EVENT_RESET | TCP_STATE_CLOSED | 0 | 0 | 0 |
| TCP_STATE_TIME_WAIT | TCP_EVENT_SYN | TCP_STATE_TIME_WAIT | 0 | 0 | 0 |
| TCP_STATE_TIME_WAIT | TCP_EVENT_SYN_ACK | TCP_STATE_TIME_WAIT | 0 | 0 | 0 |
| TCP_STATE_TIME_WAIT | TCP_EVENT_ACK | TCP_STATE_TIME_WAIT | 0 | 0 | TCP_FLAG_ACK |
| TCP_STATE_TIME_WAIT | TCP_EVENT_FIN | TCP_STATE_TIME_WAIT | 0 | 0 | TCP_FLAG_ACK |
| TCP_STATE_TIME_WAIT | TCP_EVENT_FIN_ACK | TCP_STATE_TIME_WAIT | 0 | 0 | 0 |
| TCP_STATE_TIME_WAIT | TCP_EVENT_DATA | TCP_STATE_TIME_WAIT | 0 | 0 | 0 |
| TCP_STATE_TIME_WAIT | TCP_EVENT_TIME_M | TCP_STATE_TIME_WAIT | 0 | 0 | 0 |
| TCP_STATE_TIME_WAIT | TCP_EVENT_TIME_P | TCP_STATE_CLOSED | TCP_APP_EVENT_CONNECTION_CLOSED | TCP_TIMER_CAN_SCH_MSL | 0 |

DATAEnd 160-1

FIG.5

| 171-1 | 172-1 | 173-1 | 174-1 | 175-1 | 176-1 |
|---|---|---|---|---|---|
| STATE_OPEN | EVENT_TRANSPORT_HALF_CLOSED<br>EVENT_TRANSPORT_DOWN<br>EVENT_DATA_SENT<br>EVENT_RECV_RECORDS<br>EVENT_PARSE_BUFFERED_RECORDS | ACTION_PROCESS_TRANSPORT_DOWN_HS,<br>ACTION_CREATE_CONN_NOT_ACTIVATED,<br>ACTION_ENQUEUE_DEFERRED<br>ACTION_PROCESS_DATA_SENT<br>ACTION_PROCESS_RECV_RECORDS<br>ACTION_PROCESS_PARSE_BUFFERED_RECORDS | STATE_STOPPING | EVENT_HSM_ABORT | QUEUE_EVENT,<br>QUEUE_PENDING |
| | EVENT_SEND_DATA | ACTION_ENQUEUE_PENDING | | | QUEUE_EVENT<br>QUEUE_EVENT |
| | EVENT_TLS_UP | ACTION_PROCESS_TLS_UP | STATE_OPEN | | QUEUE_EVENT,<br>QUEUE_PENDING<br>QUEUE_EVENT,<br>QUEUE_PENDING |
| | EVENT_TLS_NOT_UP | ACTION_PROCESS_TLS_NOT_UP | STATE_CLOSING | | |
| | EVENT_DIGEST_ENCRYPT | ACTION_PROCESS_DIGEST_ENCRYPT | | | QUEUE_EVENT,<br>QUEUE_PENDING |
| | EVENT_DECRYPT | ACTION_PROCESS_DECRYPT | | | QUEUE_EVENT,<br>QUEUE_PENDING |
| | EVENT_DEACTIVATE_CONN | ACTION_CREATE_CONN_DEACTIVATED,<br>ACTION_ENQUEUE_DEFERRED | STATE_CLOSING | EVENT_HSM_CLOSE | QUEUE_EVENT,<br>QUEUE_PENDING |
| | EVENT_TERMINATE_CONN | ACTION_CREATE_CONN_DEACTIVATED,<br>ACTION_ENQUEUE_DEFERRED | STATE_TERMINATING | EVENT_HSM_CLOSE | QUEUE_EVENT,<br>QUEUE_PENDING |
| | EVENT_NO_PENDING | ACTION_DO_NOTHING | | | |
| | EVENT_TRANSPORT_DOWN<br>EVENT_TRANSPORT_HALF_CLOSED<br>EVENT_DATA_SENT<br>EVENT_RECV_RECORDS<br>EVENT_PARSE_BUFFERED_RECORDS | ACTION_PROCESS_TRANSPORT_DOWN_OPEN,<br>ACTION_CREATE_CONN_DEACTIVATED,<br>ACTION_ENQUEUE_DEFERRED<br>ACTION_PROCESS_TRANSPORT_HALF_CLOSED<br>ACTION_PROCESS_DATA_SENT<br>ACTION_PROCESS_RECV_RECORDS<br>ACTION_PROCESS_PARSE_BUFFERED_RECORDS | STATE_STOPPING | EVENT_HSM_ABORT | QUEUE_EVENT,<br>QUEUE_PENDING |
| | EVENT_SEND_DATA | ACTION_PROCESS_SEND_DATA | | | QUEUE_EVENT<br>QUEUE_EVENT |
| | EVENT_TLS_DOWN | ACTION_PROCESS_TLS_DOWN | STATE_CLOSING | | QUEUE_EVENT,<br>QUEUE_PENDING |
| | EVENT_DIGEST_ENCRYPT | ACTION_PROCESS_DIGEST_ENCRYPT | | | QUEUE_EVENT,<br>QUEUE_PENDING |
| | EVENT_DECRYPT | ACTION_PROCESS_DECRYPT | | | QUEUE_EVENT,<br>QUEUE_PENDING |
| STATE_CLOSING | EVENT_UNDEFINE_CONN | ACTION_CREATE_CONN_UNDEFINED,<br>ACTION_ENQUEUE_DEFERRED | STATE_UNDEFINING | | QUEUE_EVENT,<br>QUEUE_PENDING |
| | EVENT_DEACTIVATE_CONN | ACTION_ASSERT | | | QUEUE_EVENT<br>QUEUE_EVENT |
| | EVENT_TERMINATE_CONN | ACTION_IGNORE_REQUEST | | | QUEUE_EVENT,<br>QUEUE_PENDING |
| | EVENT_NO_PENDING | ACTION_CLEANUP, ACTION_PROCESS_DEFERRED_QUEUE | STATE_CLOSED | | QUEUE_EVENT,<br>QUEUE_PENDING |
| | EVENT_TRANSPORT_DOWN | ACTION_PROCESS_TRANSPORT_DOWN | STATE_STOPPING | | QUEUE_EVENT,<br>QUEUE_PENDING |
| | EVENT_TRANSPORT_HALF_CLOSED | ACTION_PROCESS_TRANSPORT_HALF_CLOSED | STATE_STOPPING | | QUEUE_EVENT,<br>QUEUE_PENDING |
| | EVENT_DATA_SENT | ACTION_PROCESS_DATA_SENT | | | QUEUE_EVENT,<br>QUEUE_PENDING |
| | EVENT_RECV_RECORDS | ACTION_PROCESS_RECV_RECORDS | | | QUEUE_EVENT,<br>QUEUE_PENDING |

FIG. 7

| 171-2 | 172-2 | 173-2 | 173-4 | 175-2 | 176-2 |
|---|---|---|---|---|---|
| STATE_TERMINATING | EVENT_SEND_DATA | ACTION_REJECT_SEND_DATA | | | QUEUE_EVENT, QUEUE_PENDING |
| | EVENT_DIGEST_ENCRYPT | ACTION_PROCESS_DIGEST_ENCRYPT | | | QUEUE_EVENT, QUEUE_PENDING |
| | EVENT_DECRYPT | ACTION_PROCESS_DECRYPT | | | QUEUE_EVENT, QUEUE_PENDING |
| | EVENT_UNDEFINE_CONN | ACTION_CREATE_CONN_UNDEFINED, ACTION_ENQUEUE_DEFERRED | STATE_UNDEFINING | | QUEUE_EVENT, QUEUE_PENDING |
| | EVENT_DEACTIVATE_CONN | ACTION_ASSERT | | | QUEUE_EVENT, |
| | EVENT_TERMINATE_CONN | ACTION_IGNORE_REQUEST | | | QUEUE_EVENT, QUEUE_PENDING |
| | EVENT_NO_PENDING | ACTION_CLEANUP, ACTION_PROCESS_DEFERRED_QUEUE | STATE_CLOSED | | |
| | EVENT_TRANSPORT_DOWN | ACTION_PROCESS_TRANSPORT_DOWN | STATE_STOPPING | | QUEUE_EVENT, QUEUE_PENDING |
| | EVENT_TRANSPORT_HALF_CLOSED | ACTION_PROCESS_TRANSPORT_HALF_CLOSED | STATE_STOPPING | | QUEUE_EVENT, QUEUE_PENDING |
| | EVENT_DATA_SENT | ACTION_PROCESS_DATA_SENT | | | QUEUE_EVENT, QUEUE_PENDING |
| | EVENT_RECV_RECORDS | ACTION_IGNORE_RECORDS | | | QUEUE_EVENT, QUEUE_PENDING |
| STATE_STOPPING | EVENT_SEND_DATA | ACTION_REJECT_SEND_DATA | | | QUEUE_EVENT, QUEUE_PENDING |
| | EVENT_DIGEST_ENCRYPT | ACTION_PROCESS_DIGEST_ENCRYPT | | | QUEUE_EVENT, QUEUE_PENDING |
| | EVENT_DECRYPT | ACTION_IGNORE_DECRYPT | | | QUEUE_EVENT, QUEUE_PENDING |
| | EVENT_UNDEFINE_CONN | ACTION_CREATE_CONN_UNDEFINED, ACTION_ENQUEUE_DEFERRED | STATE_UNDEFINING | | QUEUE_EVENT, QUEUE_PENDING |
| | EVENT_DEACTIVATE_CONN | ACTION_CREATE_CONN_DEACTIVATED, ACTION_ENQUEUE_DEFERRED | | | QUEUE_EVENT, QUEUE_PENDING |
| | EVENT_TERMINATE_CONN | ACTION_IGNORE_REQUEST | | | QUEUE_EVENT, QUEUE_PENDING |
| | EVENT_NO_PENDING | ACTION_CLEANUP, ACTION_PROCESS_DEFERRED_QUEUE | STATE_STOPPED | | |
| | EVENT_TRANSPORT_DOWN | ACTION_PROCESS_TRANSPORT_DOWN | | | |
| | EVENT_DATA_SENT | ACTION_PROCESS_DATA_SENT | | | QUEUE_EVENT, QUEUE_PENDING |
| | EVENT_RECV_RECORDS | ACTION_ASSERT | | | QUEUE_EVENT, QUEUE_PENDING |
| | EVENT_SEND_DATA | ACTION_REJECT_SEND_DATA | | | QUEUE_EVENT, QUEUE_PENDING |
| | EVENT_DIGEST_ENCRYPT | ACTION_IGNORE_DIGEST_ENCRYPT | | | QUEUE_EVENT, QUEUE_PENDING |
| | EVENT_DECRYPT | ACTION_IGNORE_DECRYPT | | | QUEUE_EVENT, QUEUE_PENDING |

TABLE DRIVEN EVENT PROCESSING OF MULTIPLE STATEFUL PROTOCOLS IN A HIGH PERFORMANCE NETWORK STACK FRAMEWORK

PRIORITY TO PROVISIONAL APPLICATION

This U.S. Utility Patent Application claims the benefit of the filing date of an earlier filed U.S. Provisional Application for patent having U.S. Ser. No. 60/978,207, filed on Oct. 8, 2007 entitled "High Performance TCP." The entire teaching, disclosure and contents of this provisional patent are hereby incorporated by reference herein in their entirety.

BACKGROUND

A conventional finite state machine (hereinafter "conventional FSM") is an abstract machine consisting of a set of states (including the initial state), a set of input events, a set of output events, and a state transition function. The function takes the current state and an input event and returns output events and the next state. Some states may be designated as "terminal states". A conventional finite state machine can also be viewed as a function which maps an ordered sequence of input events into a corresponding sequence of (sets of) output events. A deterministic conventional FSM is one where the next state is uniquely determined by a single input event. In contrast, the next state of a non-deterministic conventional FSM depends not only on the current input event but also on an arbitrary number of subsequent input events. Until such subsequent events occur, therefore, it is not possible to determine the next state.

SUMMARY

Conventional finite state machines implementing network protocols in a network stack framework suffer from a variety of deficiencies. In particular, conventional FSMs typically relate to a single set of rules corresponding to a single protocol and do not deal with the interaction between the conventional FSM and the network stack framework. In order to process multiple events according to different protocols, multiple FSM's must be implemented—with one conventional FSM corresponding to each protocol. However, often a conventional FSM will process an input event according to its own format, thereby creating an output event described according to that conventional FSM's format. Thus, the output event cannot be processed as an input event for another conventional FSM that requires input events described according to a different format.

Methods and apparatus provide for a finite state machine environment that includes a plurality of interoperable event processing tables. Each event processing table embodies a distinct finite state machine and provides a set of rules that correspond with the logic of a particular protocol. In addition, upon receiving an event, the finite state machine environment converts the event to a finite state machine event in order to represent the event according to a format that is compatible with each of the plurality of event processing tables. Thus, unlike conventional FSM's, the finite state machine environment described herein can process events according to multiple protocols (such as stateful protocols, system protocols, and/or a network stack framework).

Since there is a uniform format for describing events in the finite state machine environment, a first event processing table can apply a rule (corresponding to logic of a first protocol) to an input event and create an output event formatted according to the finite state machine environment's native format. Due to the uniformity of format, the output event can thereby be treated as an input event for a second processing table—which applies rules according to logic of a second protocol. Thus, each of the event processing tables in the finite state machine environment is interoperable with each other.

Specifically, the finite state machine environment described herein, which implements network protocols in a network stack framework, (hereinafter "FSME" or "finite state machine environment"), receives at least one event. The FSME converts the event to a finite state machine event. The FSME selects a first event processing table from a plurality of interoperable event processing tables. The FSME processes the finite state machine event in the first event processing table to determine an action to perform based on a state of the finite state machine embodied by the first event processing table and the type of the event.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a high—performance finite state machine as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a high—performance network stack finite state machine framework as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other media such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

It is to be understood that the system disclosed herein may be embodied strictly as a software program, as software and hardware, or as hardware alone. The embodiments disclosed herein, may be employed in software and hardware such as those manufactured by Empirix Inc. of Bedford Mass.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a finite state machine implementing network protocols in a network stack framework, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 3, FIG. 4 and FIG. 5 each display sections of an event processing table defining a set rules that embody a finite state machine operating according to logic of transmission control protocol according to embodiments herein.

FIG. 6, FIG. 7 and FIG. 8 each display sections of an event processing table defining a set rules that embodies a finite state machine operating according to logic of transport layer security protocol interacting with a network stack framework according to embodiments herein.

DETAILED DESCRIPTION

Figure 1:
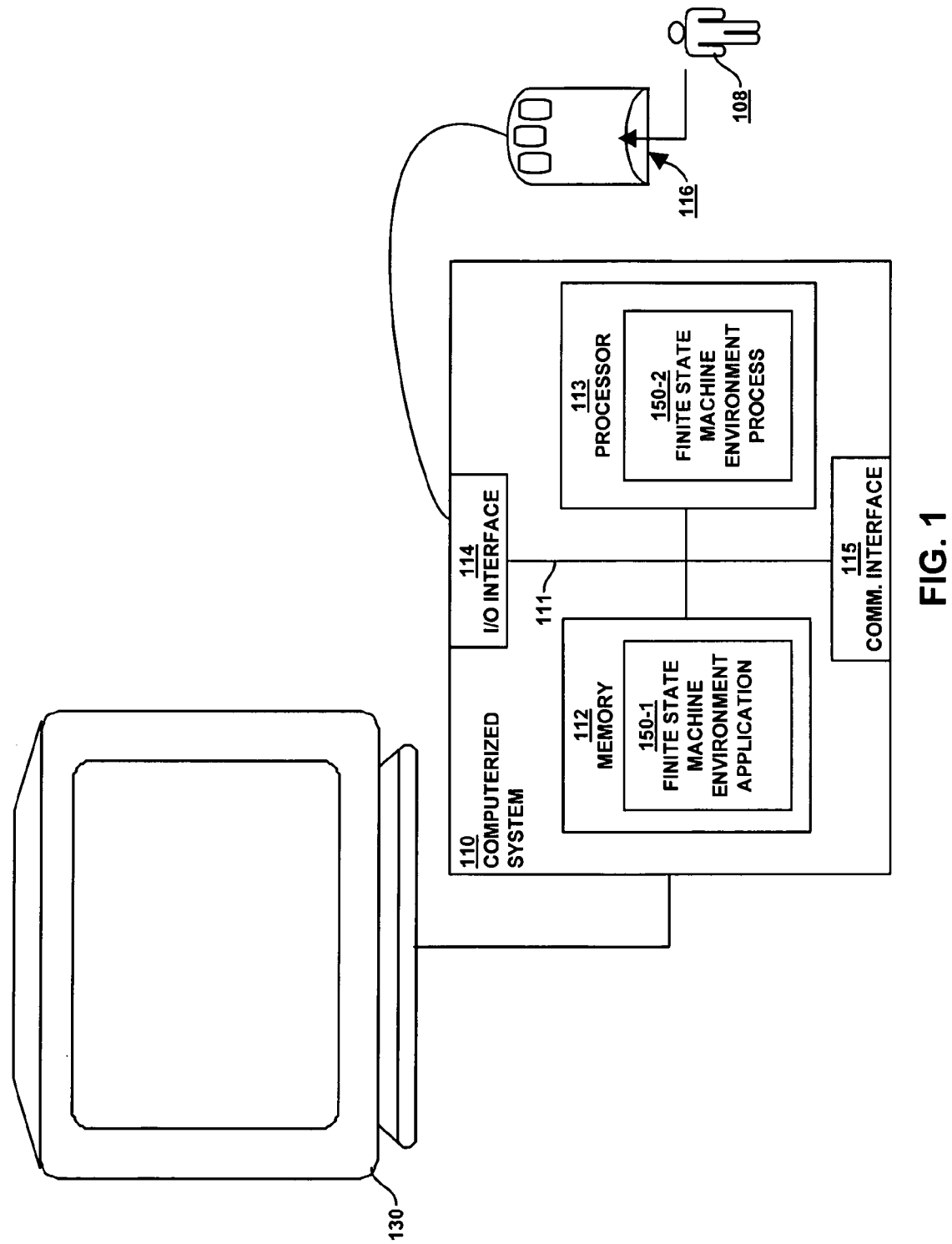
FIG. 1 is an example block diagram illustrating an architecture of a computer system that executes a finite state machine application environment application and/or a finite state machine environment process according to embodiments herein.

FIG. 1 is an example block diagram illustrating an architecture of a computer system 110 that executes, runs, interprets, operates or otherwise performs a finite state machine environment application 150-1 and/or finite state machine environment process 150-2 (e.g. an executing version of a finite state machine environment 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the high-performance finite state machine 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the finite state machine environment application 150-1 and/or the finite state machine environment process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the finite state machine environment application 150-1. Execution of the finite state machine environment application 150-1 in this manner produces the finite state machine environment process 150-2. In other words, the finite state machine environment process 150-2 represents one or more portions or runtime instances of the finite state machine environment application 150-1 (or the entire application 150-1) performing or executing within or upon the processor 113 in the computerized device 110 at runtime.

The finite state machine environment application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the finite state machine environment application 150-1 can be executed on a remotely accessible computerized device via the communication interface 115.

Figure 2:
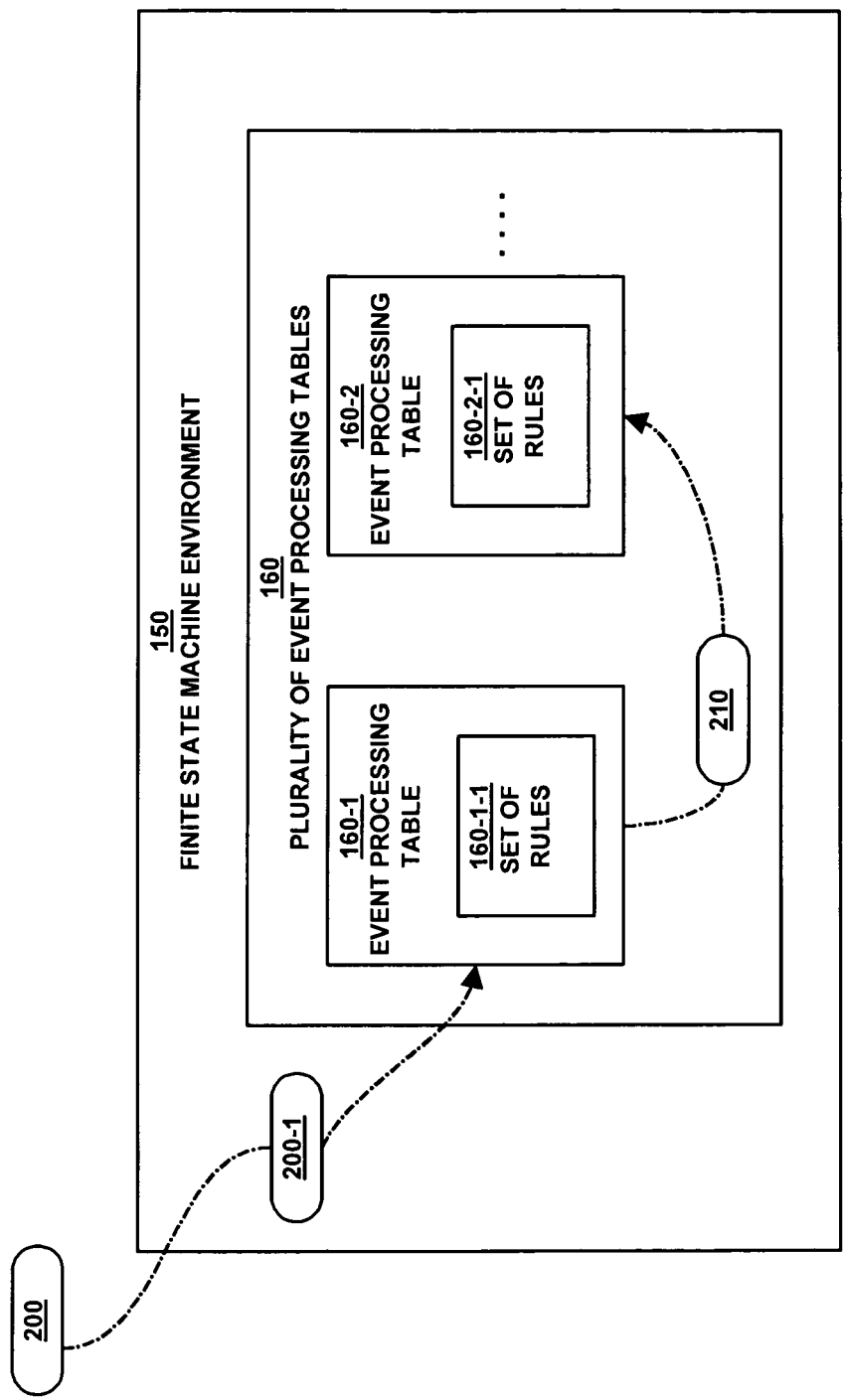
FIG. 2 is an example block diagram of a finite state machine environment processing a finite state machine event via an event processing table according to embodiments herein.

Turning now to FIG. 2, FIG. 2 is an example block diagram of a finite state machine environment 150 processing a finite state machine event 200-1 via an event processing table 160-1 according to embodiments herein.

The FSME 150 receives an external event 200 (such as an administrative event, a protocol data unit, a timer event). The FSME 150 converts the event 200 to a finite state machine event 200-1 in order to describe the event 200 in a format that is native to the FSME 150 and compatible with each event processing table in the plurality of interoperable event processing tables 160. It is understood that each event processing table 160-1, 160-2 embodies a distinct finite state machine by defining a set of rules according to a particular protocol (such as a stateful protocol, a stateful system protocol, and a network stack framework).

The FSME 150 selects a first event processing table 160-1 and processes the finite state machine event 200-1 in the first event processing table 160-1 to determine an action to perform based on a state of the finite state machine embodied by the first event processing table 160-1 and the type of the event 200. For example, the FSME 150 identifies transmission control protocol (TCP) as the stateful protocol associated with the event 200. The FSME 150 searches the plurality of interoperable event processing tables 160 to find a particular event processing table 160-1 that defines a set of rules 160-1 that comply with the logic of TCP.

The FSME 150 utilizes a current state of the finite state machine embodied by the first event processing table 160-1 as a first input parameter for a rule in the set of rules 160-1-1. The FSME 150 utilizes a type of the finite state machine event 200-1 as a second input parameter for the rule. Based on the first input parameter and the second input parameter, the FSME 150 identifies a rule and performs an action described by the rule to change the state of the finite state machine embodied by the first event processing table 160-1. In addition, performing the action described by the rule creates a second finite state machine event 210 in the format native to the FSME 150.

Thus, although the second finite state machine event 210 is output from the first event processing table 160-1, it can be received by the FSME 150 as input for another event processing table from the plurality of interoperable event processing tables 160. It is understood that any rule from an event processing table in the plurality of interoperable event processing tables 160 can describe an action that creates a new event in response to a received finite state machine event, cancels a timer, arms a timer, formats a protocol data unit according to a stateful protocol, and/or parses a protocol data unit according to the stateful protocol.

The FSME 150 identifies transport layer security (TLS) as the stateful protocol associated with the second finite state machine event 210. The FSME 150 searches the plurality of interoperable event processing tables 160 to find a particular event processing table 160-2 that defines a set of rules 160-2 that comply with the logic of TLS.

The FSME 150 utilizes a current state of the finite state machine embodied by the second event processing table 160-2 as a first input parameter for a rule in the set of rules 160-2-1. The FSME 150 utilizes the type of the second finite state machine event 210 as a second input parameter for the rule. Based on the first input parameter and the second input parameter, the FSME 150 identifies a rule from the set of rules 160-2-1 and performs an action described by the rule to change the state of the second finite state machine embodied by the second event processing table 160-2.

FIGS. 3-5 each display sections of an event processing table 160-1 defining a set rules that embody a finite state machine operating according to logic of transmission control protocol (TCP) according to embodiments herein. The first event processing table 160-1 provides a column 161, 161-1, 161-2 indicating a current state of the finite state machine as a first input parameter for a rule in the first event processing table 160-1. The first event processing table 160-1 provides a second column 162, 162-1, 162-2 that indicates a type of TCP event (represented as a finite state machine event) required as a second input parameter.

The first event processing table 160-1 provides a third column 163, 163-1, 163-2 indicating new states to which the finite state machine transitions in response to receiving a finite state machine event of a certain type when the finite state machine event is in a particular state. The first event processing table 160-1 provides a fourth column 164, 164-1, 164-2 describing a type of application event created upon transitioning the finite state machine to a particular new state. The first event processing table 160-1 provides a fifth column 165, 165-2, 165-3 describing an internal TCP timer action created upon transitioning the finite state machine to a particular new state. A sixth column 166, 166-1, 166-2 is also provided by the first event processing table 160-1 describing a TCP flag setting for packets upon transitioning the finite state machine to a particular new state. It is understood that the required input parameters, actions, and generated events for a rule in the first event processing table 160-1 are described in a single horizontal entry across each column 161 to 166, 161-1 to 166-1, 161-2 to 166-2.

For example, when the finite state machine embodied by the first event processing table 160-1 is at a state of TCP_STATE_SYN_SENT 310, then a TCP SYN packet has been sent and the finite state machine embodied by the first event processing table 160-1 is waiting for acknowledgement of the sent SYN packet. The FSME 150 receives a finite state machine event at the first event processing table 160-1, where the received finite state machine is of a type TCP_EVENT_SYN_ACK 320—which represents an acknowledgement of the sent SYN packet.

Based on the state of TCP_STATE_SYN_SENT 310 and the received finite state machine event of type TCP_EVENT_SYN_ACK 320 as input parameters, the first event processing table 160-1 defines a rule which describes an action to perform consisting of transitioning the finite state machine to a new state of TCP_ESTABLISHED 330—which represents that a TCP connection has been established. In addition, the rule defines additional actions upon transitioning the finite state machine embodied by the first event processing table 160-1 to the new state of TCP_ESTABLISHED 330.

The rule creates a new finite state machine event of TCP_APP_EVENT_CONNECTION_OPENED 340. The new finite state machine event of TCP_APP_EVENT_CONNECTION OPENED 340 creates a message that informs an application that sought establishment of the TCP connection that the TCP connection is in fact currently open. Since the new finite state machine event of TCP_APP_EVENT_CONNECTION OPENED 340 is in a format native to the FSME 150, it can be used as an input event for a second event processing table which embodies a completely different finite state machine that operates according to the logic of a protocol other than TCP.

The rule also creates an internal TCP event of TCP_TIMER_CANCEL 350, which cancels a timer used to determine an appropriate time to resend the SYN packet. Since the SYN packet was acknowledged, as represented by the received finite state machine event of type TCP_EVENT_SYN_ACK 320, the rule determines that the timer must be canceled so as not to inadvertently resend the SYN packet. Another event created by the rule is an event of TCP_FLAG_ACK 360 which represents an internal TCP action to send a TCP packet that acknowledges receipt of the SYN packet.

Figure 6:
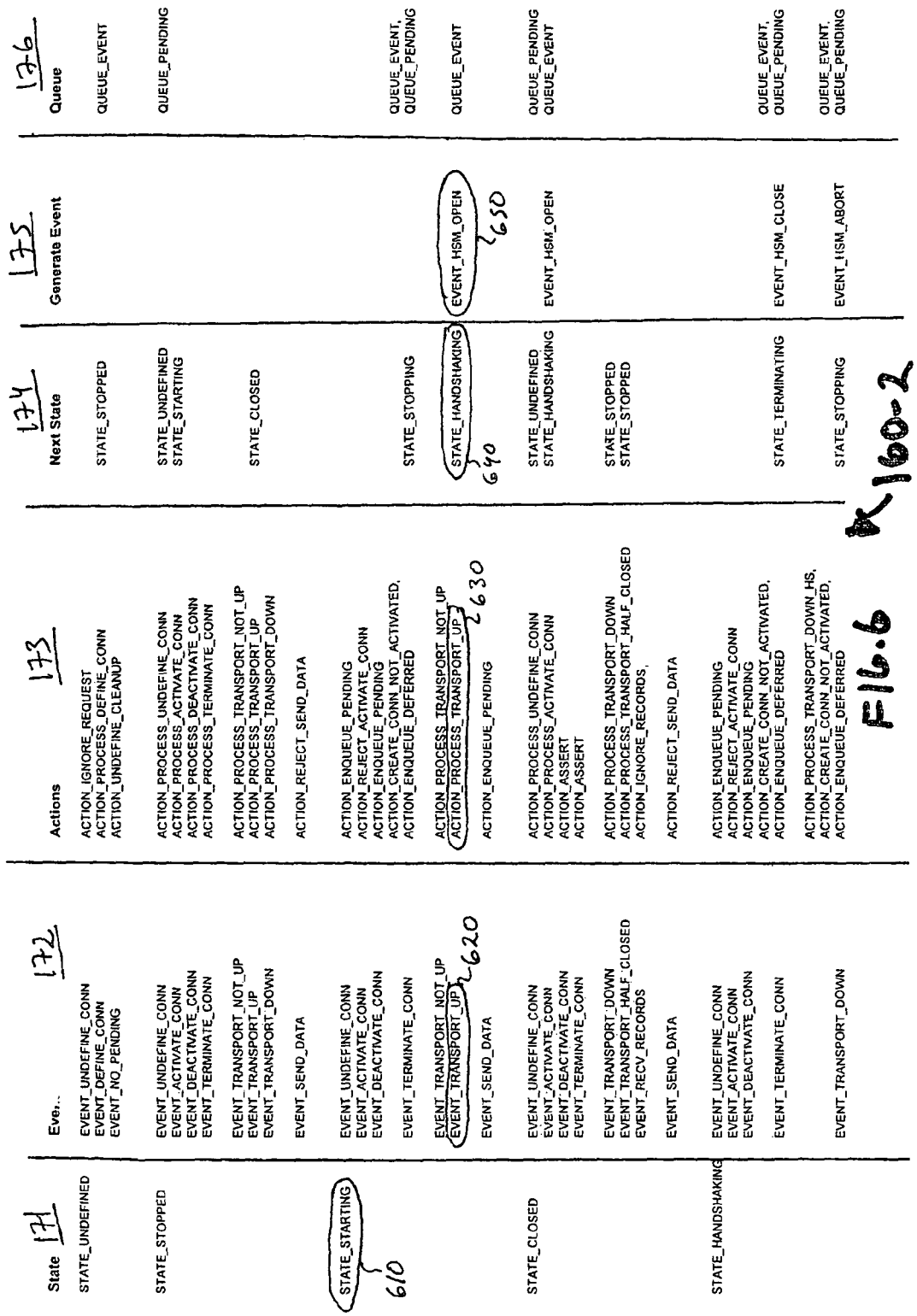

FIGS. 6-8 each display sections of an event processing table 160-2 defining a set rules that embody a finite state machine operating according to logic of transport layer security protocol (TLS) according to embodiments herein. The second event processing table 160-2 provides a column 171, 171-1, 171-2 indicating a current state of the finite state machine (embodied by the second event processing table 160-2) as a first input parameter for a rule in the second event processing table 160-2. The second event processing table 160-2 provides a second column 172, 172-1, 172-2 that indicates a type of TLS event (or a received finite state machine event) required as a second input parameter. The second event processing table 160-2 provides a third column 173, 173-1, 173-2 that indicates an action to be performed given a particular state of the finite state machine (embodied by the second event processing table 160-2) and a given type of a received TLS event.

The second event processing table 160-2 provides a fourth column 174, 174-1, 174-2 indicating new states to which the finite state machine (embodied by the second event processing table 160-2) transitions in response to receiving a finite state machine event of a certain type when the finite state machine is in a particular state. The second event processing table 160-2 provides a fifth column 175, 175-1, 175-2 describing a type of event created upon transitioning the finite state machine (embodied by the second event processing table 160-2) to a particular new state. The second event processing table 160-2 provides a sixth column 176, 176-1, 176-2 describing a queue event created upon transitioning the finite state machine (embodied by the second event processing table 160-2) to a particular new state.

For example, the second event processing table 160-2 receives the finite state machine event of TCP_APP_EVENT_CONNECTION OPENED 340 from the first event processing table 160-1. The second event processing table 160-2 maps the finite state machine event of TCP_APP_EVENT_CONNECTION OPENED 340 according to a network framework. The network framework defines a mapping of events to translate the finite state machine event of TCP_APP_EVENT_CONNECTION OPENED 340 to a finite state machine event of EVENT_TRANSPORT_UP 620.

When the finite state machine (embodied by the second event processing table 160-2) is at a state of STATE_STARTING 610, and the second event processing table receives the event of EVENT_TRANSPORT_UP 620, the second event processing table 160-2 defines a rule which describes an action of ACTION_PROCESS_TRANSPORT_UP 630—which represents sending an external event outside of a network framework to an application that requested TLS facilities over TCP. The action of ACTION_PROCESS_TRANSPORT_UP 630 informs the application that the TCP connection is open.

In addition, the rule transitions the finite state machine embodied by the second event processing table 160-2 to a new state of STATE_HANDSHAKING 640. The rule also creates a third finite state machine event of EVENT_HSM_OPEN 650. Since the third finite state machine event of EVENT_HSM_OPEN 650 is in a format native to the FSME 150, it can be used as an input event for a third event processing table which embodies a completely different finite state machine that operates according to the logic of TLS.

Figure 9:
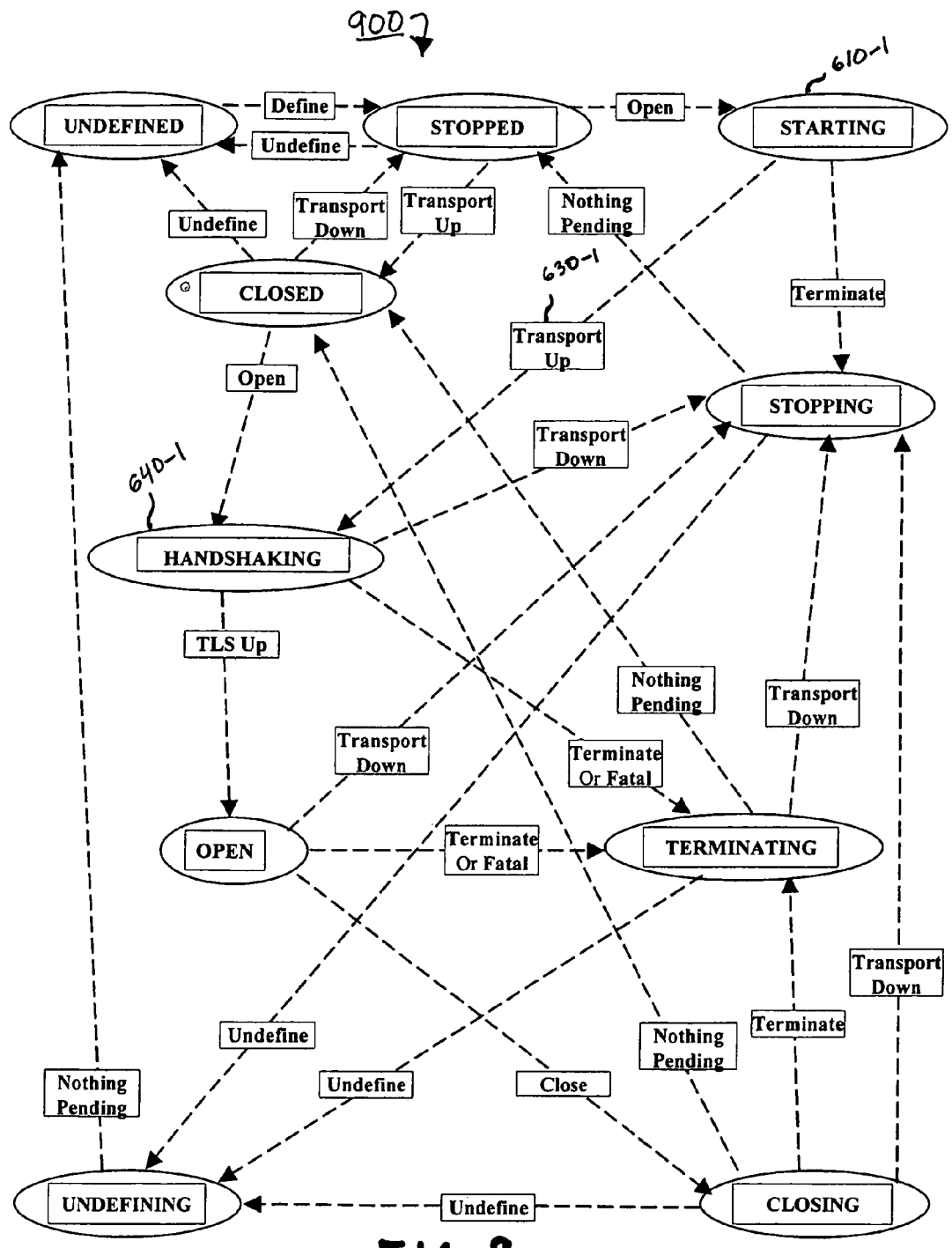
FIG. 9 is an example state diagram for a finite state machine embodied by an event processing table in a plurality of interoperable event processing tables according to embodiments herein.

FIG. 9 is an example state diagram 900 for a finite state machine embodied by an event processing table 160-2 in the plurality of interoperable event processing tables 160 according to embodiments herein. In the state diagram 900, various possible states for the finite state machine are presented within ovals, such as STARTING 610-1 (which is described in the second event processing table 160-2 as STATE_STARTING 610) and HANDSHAKING 640-1 (which is described in the second event processing table 160-2 as STATE_HANDSHAKING 640). Events are illustrated in the state diagram 900 as boxes located between ovals, such as Transport Up 630-1 (which is described in the second event processing table 160-2 as EVENT_TRANSPORT_UP 620).

It is understood that the events (i.e. boxes located between ovals) illustrated in the state diagram 900 result in the transition from a current state of the finite state machine embodied by an event processing table 160-2 to a new state. In other words, as similarly discussed above with respect to FIGS. 6-8, an event of Transport Up 630-1 transitions the state of the finite state machine in the state diagram 900 from STARTING 610-1 to HANDSHAKING 640-1.

Figure 10:
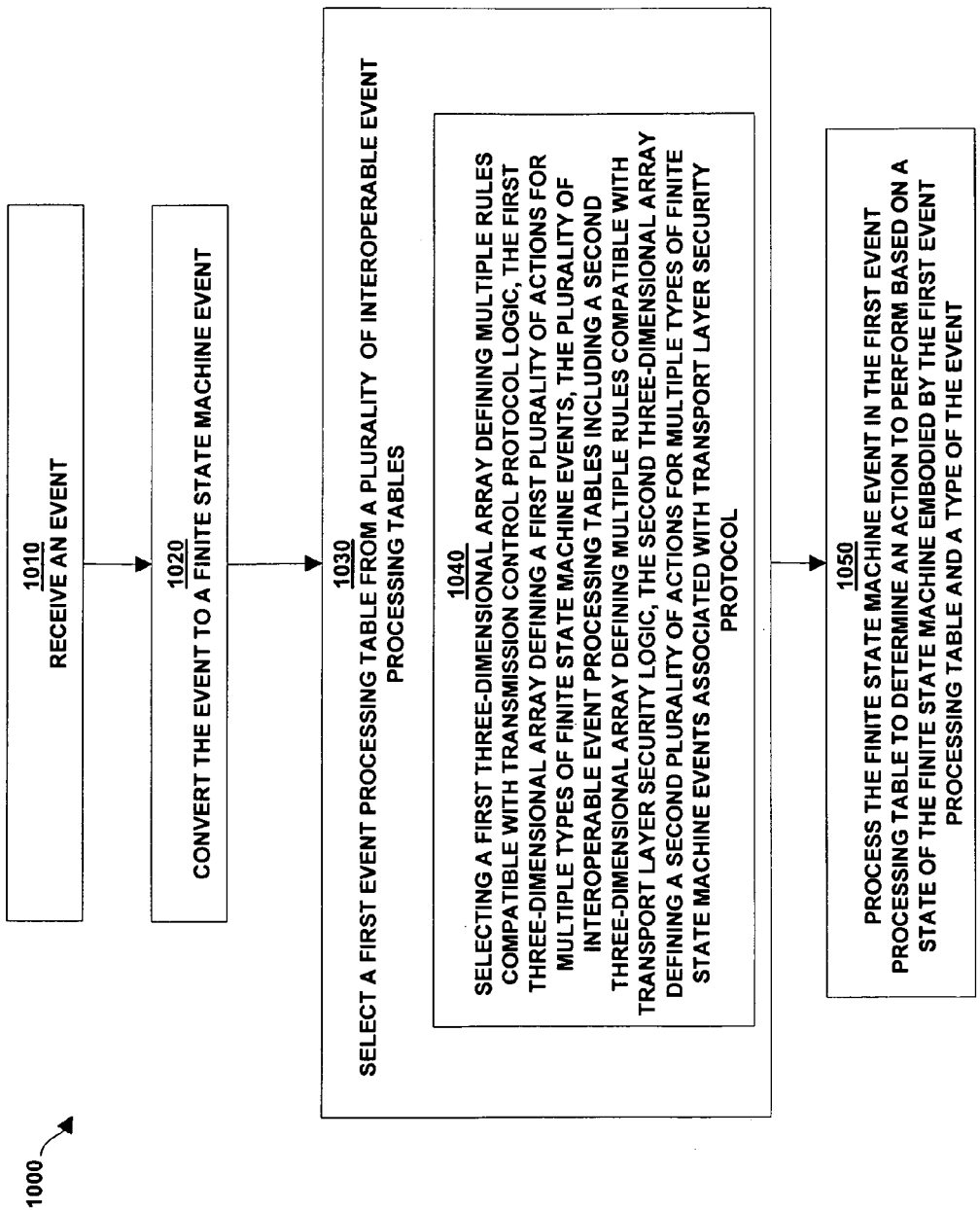
FIG. 10 is a flowchart of an example of processing steps performed within a finite state machine environment to processing a finite state machine event in an event processing table to determine an action to perform based on a state of a finite state machine embodied by the event processing table and a type of the event according to embodiments herein.
Figure 11:
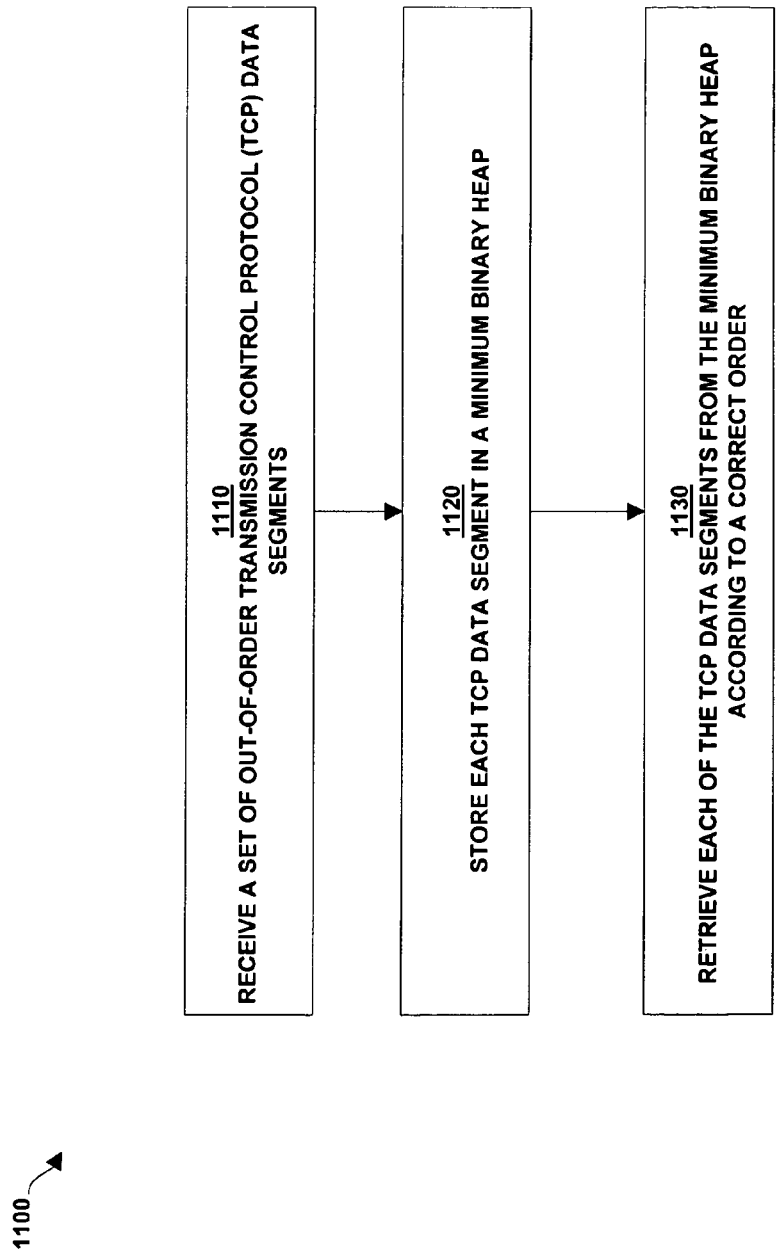
FIG. 11 is a flowchart of an example of processing steps performed within a TCP data segment re-assembler using a binary heap algorithm for TCP segment re-assembly according to embodiments herein.

FIG. 10 provides a flowchart 1000 describing processing steps performed by the FSME 150 and FIG. 11 provides a flowchart 1100 describing processing steps performed by a TCP data segment orderer 250. The rectangular elements in flowcharts 1000, 1100 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 1000, 1100 do not necessarily depict the syntax of any particular programming language. Rather, flowcharts 1000, 1100 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

FIG. 10 is a flowchart 100 of an example of processing steps performed within a finite state machine environment 150 to processing a finite state machine event in an event processing table to determine an action to perform based on a state of a finite state machine embodied by the event processing table and a type of the event. according to embodiments herein.

At step 1010, the FSME 150 receives an event, such as an external event or an event created by an event processing table.

At step 1020, the FSME 150 converts the event to a finite state machine event.

At step, 1030 the FSME 150 selects a first event processing table from a plurality of interoperable event processing tables.

At step 1040, for example, the FSME 150 selects a first three-dimensional array defining multiple rules compatible with transmission control protocol logic, the first three-dimensional array defines a first plurality of actions for multiple types of finite state machine events. In addition to the first three-dimensional array, the plurality of interoperable event processing tables includes a second three-dimensional array that defines multiple rules compatible with transport layer security logic. The second three-dimensional array defines a second plurality of actions for multiple types of finite state machine events associated with transport layer security protocol At step 1050, the FSME 150 processes the finite state machine event in the first event processing table to determine an action to perform based on a state of the finite state machine embodied by the first event processing table and a type of the event.

FIG. 11 is a flowchart 1100 of an example of processing steps performed within a TCP data segment re-assembler using a binary heap algorithm for TCP segment re-assembly according to embodiments herein. It is understood that a computer system, having a similar architecture as computer system 110, can execute, run, interpret, operate or otherwise perform a TCP data segment re-assembler application and/or TCP data segment re-assembler process (e.g. an executing version of a TCP data segment re-assembler) in a similar manner as how the computer system 110 executes, runs, interprets, operates or otherwise performs the finite state machine environment application 150-1 and/or finite state machine environment process 150-2.

At step 1110, the TCP data segment re-assembler receives a set of out-of-order transmission control protocol (TCP) data segments.

At step 1120, the TCP data segment re-assembler stores each TCP data segment in a minimum binary heap. For each received TCP data segment, the TCP data segment re-assembler retrieves a sequence number range of the TCP data segment. The TCP data segment re-assembler uses the sequence number range as an ordering criteria to determine a position within the minimum binary heap for the TCP data segment. The TCP data segment re-assembler generates a unique descriptor for the TCP data segment and inserts the unique descriptor for the TCP data segment at the determined position within the minimum binary heap At step 1130, the TCP data segment re-assembler retrieves each of the TCP data segments from the minimum binary heap according to a correct order. The TCP data segment re-assembler retrieves a first unique descriptor located at a top position top of the minimum binary heap and obtains a first TCP data segment corresponding to the first unique descriptor. The TCP data segment re-assembler deliveries the first TCP data segment corresponding to the first unique descriptor located at the top position of the minimum binary heap to a network stack. The TCP data segment re-assembler rebalances the minimum binary heap by placing a second unique descriptor at the top position in the binary heap, where the second unique descriptor corresponds to a second TCP data segment comprising a lowest sequence number range currently in the minimum binary heap. Then, with respect to a current unique descriptor located at the top position of the minimum binary heap, the TCP data segment re-assembler performs the steps of retrieving, obtaining, delivering and rebalancing until the TCP data segment re-assembler detects (a) the minimum binary heap no longer contains any TCP data segments or (b) a gap in the sequence number ranges amongst the TCP data segment represented by unique identifiers in the minimum binary heap.

It is noted that the methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
   receiving at least one event;
   converting the event to a finite state machine event;
   selecting a first event processing table from a plurality of interoperable event processing tables, wherein the plurality of interoperable event processing tables are configured such that an output from the first event processing table is usable as input to another event processing table of the plurality of interoperable event processing tables, wherein selecting the first event processing table from the plurality of interoperable event processing tables includes:
      identifying a first network protocol associated with the event, wherein the first network protocol is a first stateful protocol; and
      as a result of searching the plurality of interoperable event processing tables for a particular event processing table defining a set of rules associated with the first network protocol, selecting a first three-dimensional array that defines multiple rules compatible with the first stateful protocol logic, the first three-dimensional array defining a first plurality of actions for multiple types of finite state machine events, the plurality of interoperable event processing tables including at least a second three-dimensional array, a third event processing table, and a fourth event processing table, the second three-dimensional array defining multiple rules compatible with a second stateful protocol logic and defining a second plurality of actions for multiple types of finite state machine events associated with the second stateful protocol, the third event table embodying a third finite state machine and defining a third set of rules that define a third plurality of actions with respect to a stateful system protocol, the fourth event processing table embodying a fourth finite state machine and defining a fourth set of rules that define a fourth plurality of actions with respect to a network stack framework, wherein the first plurality of actions, the second plurality of actions, the third plurality of actions, and the fourth plurality of actions define at least one of:
      (i) transitioning from a current state associated with the finite state machine to a new state;
      (ii) creating a new event in response to the finite state machine event;
      (iii) cancelling a timer;
      (iv) arming a timer;
      (v) formatting a protocol data unit according to a stateful protocol; and
      (vi) parsing a protocol data unit according to the stateful protocol; and
   processing the finite state machine event in the first event processing table to determine an action to perform based on a state of the finite state machine embodied by the first event processing table and a type of the event.

2. The computer-implemented method as in claim 1, wherein receiving the event includes receiving at least one from the group consisting of:
   (i) an administrative event;
   (ii) a protocol data unit;
   (iii) a timer event;
   (iv) an event created by one of the plurality of event processing tables; and
   (v) an event created by the network stack framework.

3. The computer-implemented method as in claim 1, comprising:
   wherein the first three-dimensional array defines multiple rules compatible with logic of a transmission control protocol (TCP), and wherein the second three-dimensional array defines multiple rules compatible with logic of a transport layer security protocol (TLS).

4. The computer-implemented method as in claim 1, wherein receiving the event includes:
   upon receiving an external event, converting the external event according to format native to the plurality of interoperable event processing tables, each rule described in the plurality of interoperable event processing tables compatible with the format.

5. The computer-implemented method as in claim 1, comprising:
   implementing the finite state machine in a testing environment generating multiple events from at least a portion of a set of endpoints, the set of endpoints comprising a range of 1 to 1,000,000 individual endpoints.

6. The computer-implemented method as in claim 1, wherein processing the finite state machine event in the first event processing table to determine the action to perform based on the state of the event includes:
   applying a rule from a plurality of rules described in the first event processing table, the plurality of rules defined according to logic of the first stateful protocol, wherein applying the rule includes:
   utilizing a current state of the finite state machine embodied by the first event processing table as a first input parameter for the rule;
   utilizing a type of the finite state machine event as a second input parameter for the rule;
   based on the first input parameter and the second input parameter, performing the action describe by the rule to create a second finite state machine event; and processing the second finite state machine event in a second event processing table to determine a second action to perform based on a state of the second finite state machine event, the second event processing table comprising a plurality of rules defined according to logic of a network stack framework.

7. The computer-implemented method as in claim 1, wherein processing the finite state machine event in the first event processing table to determine the action to perform based on the state of the event includes:

detecting the finite state machine event represents an event describing completion of a packet transmission; and selecting a rule from a plurality of rules defined according to logic of the first stateful protocol, the rule describing one of:
(i) a first action to arm a timer;
(ii) a second action to cancel a timer; and
(iii) a third action to free up memory associated with the packet.

8. A computer program product including a non-transitory computer-storage medium having instructions stored thereon for processing data information, such that the instructions, when carried out by a processing device, enable the processing device to perform operations of:

receiving at least one event;

converting the event to a finite state machine event;

selecting a first event processing table from a plurality of interoperable event processing tables, wherein the plurality of interoperable event processing tables are configured such that an output from the first event processing table is usable as input to another event processing table of the plurality of interoperable event processing tables, wherein selecting the first event processing table from the plurality of interoperable event processing tables includes:

identifying a first network protocol associated with the event, wherein the first network protocol is a first stateful protocol; and as a result of searching the plurality of interoperable event processing tables for a particular event processing table defining a set of rules associated with the first network protocol, selecting a first three-dimensional array that defines multiple rules compatible with the first stateful protocol logic, the first three-dimensional array defining a first plurality of actions for multiple types of finite state machine events, the plurality of interoperable event processing tables including at least a second three-dimensional array, a third event processing table, and a fourth event processing table, the second three-dimensional array defining multiple rules compatible with a second stateful protocol logic and defining a second plurality of actions for multiple types of finite state machine events associated with the second stateful protocol, the third event table embodying a third finite state machine and defining a third set of rules that define a third plurality of actions with respect to a stateful system protocol, the fourth event processing table embodying a fourth finite state machine and defining a fourth set of rules that define a fourth plurality of actions with respect to a network stack framework, wherein the first plurality of actions, the second plurality of actions, the third plurality of actions, and the fourth plurality of actions define at least one of:

(i) transitioning from a current state associated with the finite state machine to a new state;
(ii) creating a new event in response to the finite state machine event;
(iii) cancelling a timer;
(iv) arming a timer;
(v) formatting a protocol data unit according to a stateful protocol; and
(vi) parsing a protocol data unit according to the stateful protocol; and processing the finite state machine event in the first event processing table to determine an action to perform based on a state of the finite state machine embodied by the first event processing table and a type of the event.

9. The computer program product as in claim 8, wherein the operations of receiving the event includes operations of receiving at least one from the group consisting of:
(i) an administrative event;
(ii) a protocol data unit;
(iii) a timer event;
(iv) an event created by one of the plurality of event processing tables; and
(v) an event created by the network stack framework.

10. The computer program product as in claim 8, comprising:
wherein the first three-dimensional array defines multiple rules compatible with logic of a transmission control protocol (TCP), and wherein the second three-dimensional array defines multiple rules compatible with logic of a transport layer security protocol (TLS).

11. The computer program product as in claim 8, wherein the operations of receiving the event include operations of:
upon receiving an external event, converting the external event according to format native to the plurality of interoperable event processing tables, each rule described in the plurality of interoperable event processing tables compatible with the format.

12. The computer program product as in claim 8, comprising:
operations of implementing the finite state machine in a testing environment generating multiple events from at least a portion of a set of endpoints, the set of endpoints comprising a range of 1 to 1,000,000 individual endpoints.

13. The computer program product as in claim 8, wherein operations of processing the finite state machine event in the first event processing table to determine the action to perform based on the state of the event include operations:

applying a rule from a plurality of rules described in the first event processing table, the plurality of rules defined according to logic of the first stateful protocol, wherein applying the rule includes:
utilizing a current state of the finite state machine embodied by the first event processing table as a first input parameter for the rule;
utilizing a type of the finite state machine event as a second input parameter for the rule;
based on the first input parameter and the second input parameter, performing the action describe by the rule to create a second finite state machine event; and
processing the second finite state machine event in a second event processing table to determine a second action to perform based on a state of the second finite state machine event, the second event processing table comprising a plurality of rules defined according to logic of a network stack framework.

14. The computer program product as in claim 8, wherein operations of processing the finite state machine event in the first event processing table to determine the action to perform based on the state of the event include operations of:

detecting the finite state machine event represents an event describing
completion of a packet transmission; and
selecting a rule from a plurality of rules defined according to logic of the first stateful protocol, the rule describing one of:
(i) a first action to arm a timer;
(ii) a second action to cancel a timer; and (iii) a third action to free up memory associated with the packet.

15. A computer system comprising:

a processor;

a memory unit that stores instructions associated with an application executed by the processor; and an interconnect coupling the processor and the memory unit, enabling the computer system to execute the application and perform operations of:

receiving at least one event;

converting the event to a finite state machine event;

selecting a first event processing table from a plurality of interoperable event processing tables, wherein the plurality of interoperable event processing tables are configured such that an output from the first event processing table is usable as input to another event processing table of the plurality of interoperable event processing tables, wherein selecting the first event processing table from the plurality of interoperable event processing tables includes:

identifying a first network protocol associated with the event, wherein the first network protocol is a first stateful protocol; and as a result of searching the plurality of interoperable event processing tables for a particular event processing table defining a set of rules associated with the first network protocol, selecting a first three-dimensional array that defines multiple rules compatible with the first stateful protocol logic, the first three-dimensional array defining a first plurality of actions for multiple types of finite state machine events, the plurality of interoperable event processing tables including at least a second three-dimensional array, a third event processing table, and a fourth event processing table, the second three-dimensional array defining multiple rules compatible with a second stateful protocol logic and defining a second plurality of actions for multiple types of finite state machine events associated with the second stateful protocol, the third event table embodying a third finite state machine and defining a third set of rules that define a third plurality of actions with respect to a stateful system protocol, the fourth event processing table embodying a fourth finite state machine and defining a fourth set of rules that define a fourth plurality of actions with respect to a network stack framework, wherein the first plurality of actions, the second plurality of actions, the third plurality of actions, and the fourth plurality of actions define at least one of:

(i) transitioning from a current state associated with the finite state machine to a new state;

(ii) creating a new event in response to the finite state machine event;

(iii) cancelling a timer;

(iv) arming a timer;

(v) formatting a protocol data unit according to a stateful protocol; and (vi) parsing a protocol data unit according to the stateful protocol; and processing the finite state machine event in the first event processing table to determine an action to perform based on a state of the finite state machine embodied by the first event processing table and a type of the event.

\* \* \* \* \*

UNITED STATES PATENT AND TRADEMARK OFFICE
CERTIFICATE OF CORRECTION

PATENT NO. : 8,463,925 B1  Page 1 of 1
APPLICATION NO. : 12/247682
DATED : June 11, 2013
INVENTOR(S) : Nath et al.

It is certified that error appears in the above-identified patent and that said Letters Patent is hereby corrected as shown below:

In the Drawings:

On Sheet 6 of 11, in figure 6, line 1, delete "Eve,." and insert -- Event --, therefor.

On Sheet 6 of 11, in figure 6, line 35, delete "_IISM_" and insert -- _HSM_ --, therefor.

In the Specification:

In column 8, line 24, delete "orderer" and insert -- order --, therefor.

In column 8, line 49, delete "event." and insert -- event --, therefor.

In column 9, line 3, after "protocol" insert -- . --.

In column 9, line 35, after "heap" insert -- . --.

In column 11, line 15, delete "and or" and insert -- and/or --, therefor.

Signed and Sealed this
Fifteenth Day of October, 2013

Teresa Stanek Rea
*Deputy Director of the United States Patent and Trademark Office*